United States Patent
Wang et al.

(10) Patent No.: US 11,708,272 B2
(45) Date of Patent: Jul. 25, 2023

(54) BULK SYNTHESIS OF JANUS NANOMATERIALS

(71) Applicant: Saudi Arabian Oil Company, Dhahran (SA)

(72) Inventors: Wei Wang, Quincy, MA (US); Sehoon Chang, Brighton, MA (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/940,367

(22) Filed: Sep. 8, 2022

(65) Prior Publication Data

US 2023/0002234 A1    Jan. 5, 2023

Related U.S. Application Data

(62) Division of application No. 16/818,632, filed on Mar. 13, 2020, now Pat. No. 11,472,709.

(Continued)

(51) Int. Cl.
| | |
|---|---|
| *C09K 8/584* | (2006.01) |
| *C01B 32/198* | (2017.01) |
| *C01B 32/205* | (2017.01) |
| *C09K 8/92* | (2006.01) |
| *B82Y 30/00* | (2011.01) |

(Continued)

(52) U.S. Cl.
CPC .......... *C01B 32/198* (2017.08); *C01B 32/205* (2017.08); *C09K 8/584* (2013.01); *C09K 8/92* (2013.01); *B82Y 30/00* (2013.01); *B82Y 40/00* (2013.01); *C01B 32/194* (2017.08); *C01B 2204/20* (2013.01); *C01P 2004/64* (2013.01); *C01P 2004/80* (2013.01); *C09K 2208/10* (2013.01)

(58) Field of Classification Search
CPC ..... B82Y 30/00; B82Y 40/00; C01B 2204/20; C01B 32/182; C01B 32/194; C01B 32/198; C01B 32/205; C01P 2004/64; C01P 2004/80; C09K 2208/10; C09K 8/58; C09K 8/584; C09K 8/92
See application file for complete search history.

(56) References Cited

U.S. PATENT DOCUMENTS

| | | |
|---|---|---|
| 4,772,563 A | 9/1988 | Evangelista et al. |
| 4,882,763 A | 11/1989 | Buchan et al. |

(Continued)

FOREIGN PATENT DOCUMENTS

| | | |
|---|---|---|
| EP | 2040075 | 3/2009 |
| EP | 2104082 | 9/2009 |

(Continued)

OTHER PUBLICATIONS

Meyre, et al, Radiaion-Induced synthesis of gold nanoparticles within lamellar phases. Formation of aligned colloidal gold by radiolysis, Langmuir, 24, 9, 4421-4425 (Year: 2008).*

(Continued)

*Primary Examiner* — Alicia Bland
(74) *Attorney, Agent, or Firm* — Fish & Richardson P.C.

(57) ABSTRACT

Synthesizing Janus material including forming a lamellar phase having water layers and organic layers, incorporating nanosheets and a functional agent into the lamellar phase, and attaching the functional agent to the nanosheets in the lamellar phase to form Janus nanosheets.

8 Claims, 8 Drawing Sheets

Related U.S. Application Data

(60) Provisional application No. 62/819,080, filed on Mar. 15, 2019.

(51) Int. Cl.
*B82Y 40/00* (2011.01)
*C01B 32/194* (2017.01)

(56) References Cited

U.S. PATENT DOCUMENTS

| | | | |
|---|---|---|---|
| 5,124,268 | A | 6/1992 | Dakubu |
| 5,168,927 | A | 12/1992 | Stegenneier |
| 6,488,872 | B1 | 12/2002 | Beebe et al. |
| 6,590,647 | B2 | 7/2003 | Stephenson |
| 6,691,780 | B2 | 2/2004 | Nguyen et al. |
| 7,032,662 | B2 | 4/2006 | Malone |
| 7,588,827 | B2 | 9/2009 | Nie et al. |
| 7,875,654 | B2 | 1/2011 | Hong |
| 7,879,625 | B1 | 2/2011 | Boss |
| 8,337,783 | B2 | 12/2012 | Locascio et al. |
| 8,722,812 | B2 | 5/2014 | Yabu et al. |
| 9,708,525 | B2 | 7/2017 | Suresh et al. |
| 9,873,827 | B2 | 1/2018 | Chakraborty et al. |
| 10,316,873 | B2 | 6/2019 | Weitz et al. |
| 10,392,555 | B2 | 8/2019 | Giro et al. |
| 2008/0110253 | A1 | 5/2008 | Stephenson et al. |
| 2008/0111064 | A1 | 5/2008 | Andrews et al. |
| 2008/0206317 | A1 | 8/2008 | Johnsson et al. |
| 2009/0087912 | A1 | 4/2009 | Ramos et al. |
| 2009/0248309 | A1 | 10/2009 | Nelville et al. |
| 2010/0049625 | A1 | 2/2010 | Biebesheimer et al. |
| 2010/0224823 | A1 | 9/2010 | Yin et al. |
| 2010/0307745 | A1 | 12/2010 | Lafitte |
| 2010/0314118 | A1 | 12/2010 | Quintero |
| 2011/0012331 | A1 | 1/2011 | Kim |
| 2011/0207231 | A1 | 8/2011 | Natan et al. |
| 2011/0239754 | A1 | 10/2011 | Dyer |
| 2011/0260051 | A1 | 10/2011 | Preudhomme et al. |
| 2011/0275061 | A1 | 11/2011 | Weidemaier et al. |
| 2012/0062886 | A1 | 3/2012 | Piotti |
| 2012/0115128 | A1 | 5/2012 | Miller |
| 2012/0193578 | A1 | 8/2012 | Pan et al. |
| 2012/0257199 | A1 | 10/2012 | Liu et al. |
| 2012/0261617 | A1 | 10/2012 | Pan et al. |
| 2013/0040292 | A1 | 2/2013 | Lopez et al. |
| 2013/0084643 | A1 | 4/2013 | Commarieu et al. |
| 2013/0087329 | A1 | 4/2013 | Hewitt |
| 2014/0186939 | A1 | 7/2014 | Peterman et al. |
| 2014/0231077 | A1 | 8/2014 | Rivero et al. |
| 2014/0260694 | A1 | 9/2014 | Szlendak |
| 2014/0323363 | A1 | 10/2014 | Perriat |
| 2014/0360973 | A1 | 12/2014 | Yin et al. |
| 2015/0038347 | A1 | 2/2015 | Johnson et al. |
| 2015/0175876 | A1 | 6/2015 | Resasco et al. |
| 2015/0299369 | A1 | 10/2015 | Ausserre et al. |
| 2016/0003040 | A1 | 1/2016 | Jessheim et al. |
| 2016/0097750 | A1 | 4/2016 | Van Herzen |
| 2017/0173546 | A1 | 6/2017 | Cheng et al. |
| 2017/0199124 | A1 | 7/2017 | Bolduc et al. |
| 2018/0275114 | A1 | 9/2018 | Kosynkin |
| 2019/0016943 | A1 | 1/2019 | Ren et al. |

FOREIGN PATENT DOCUMENTS

| | | |
|---|---|---|
| EP | 2480625 | 4/2013 |
| EP | 2480626 | 4/2013 |
| WO | 2010138914 | 12/2010 |
| WO | 2011035294 | 3/2011 |
| WO | 2011035292 | 10/2011 |
| WO | 2014014919 | 1/2014 |
| WO | 2015058206 | 4/2015 |
| WO | 2015097116 | 7/2015 |
| WO | 2015200060 | 12/2015 |
| WO | 2016087397 | 6/2016 |
| WO | 2017015120 | 1/2017 |
| WO | 2017136641 | 8/2017 |
| WO | 2017164822 | 9/2017 |
| WO | 2019027817 | 2/2019 |

OTHER PUBLICATIONS

Sasaki et al, Lateral growth of uniformly thin gold nanosheets facilitated by two-dimensional precursor supply, Langmuir, 37, 5872-5877 (Year: 2021).*

EPO Communication Pursuant to Article 94(3) in European Appln. No. 20718056.3, dated Feb. 1, 2023, 6 pages.

International Search Report and Written Opinion issued in International Application No. PCT/US2020/022694 dated Jun. 29, 2020, 19 pages.

GCC Examination Report in Gulf Cooperation Council Appln. No. GC 2020-39386, dated Jul. 8, 2021, 4 pages.

Agenet et al., "Fluorescent Nanobeads: a First Step Toward Intelligent Water Tracers," Society of Petroleum Engineers, presented at the SPE International Oilfield Nanotechnology Conference held in Noordwijk, the Netherlands, Jun. 12-14, 2012, 13 pages.

Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.

Armelao et al., "Design of luminescent lanthanide complexes: From molecules to highly efficient photo-emitting materials," Coordination Chemistry Reviews, vol. 254, Mar. 5-6, 2010, 19 pages.

Aslan et al., "Fluorescent Core—Shell AG@SiO$_2$ Nanocomposites for Metal-Enhanced Fluorescence and Single Nanoparticle Sensing Platforms," Jan. 19, 2007, 2 pages.

Badgett et al., "Totalsynthese eines Neobetanidin-Derivates und des Neobetenamins," Helvetica Chimica Acta, 1970, 53(2): 433-448, English Summary.

Bao et al., "Luminescence properties of the co-luminescence groups of Sm-La-pyridyl carboxylic acids," Journal of Rare Earths, 30(4), 320-324, Apr. 2012, 5 pages.

Borrini et al., "Water Soluble PDCA Derivatives for Selective Ln(III)/An(III) and Am(III)/Cm(III) Separation," Solvent Extraction and Ion Exchange, 33(3), 224-235, Oct. 2014, 30 pages.

Brichart et al., "The Use of Fluorescent Tracers for Inhibitor Concentration Monitoring Useful for Scale Inhibitor," International Petroleum Technology Conference, IPTC-17933-MS, presented at the International Petroleum Technology Conference held in Kuala Lumpur, Dec. 10-12, 2014, 8 pages.

Bünzli and Piguet, "Taking advantage of luminescent lanthanide ions," Chemical Society Reviews, vol. 34, Issue 12, Sep. 2005, 30 pages.

Chang et al., "Magnetic SERS Composite Nanoparticles for Microfluidic Detection," 251st ACE National Meeting, Mar. 13-17, 2016, 1 pages.

Chen et al., "Analysis of the solution conformations of T4 lysozyme by paramagnetic NMR spectroscopy," Physical Chemistry Chemical Physics (2016), 18(8), 5850-5859, 10 pages.

Chen et al., "Impact of Irreversible Retention on Tracer Deployments; Constraining Novel Material Deployments," SPE 188890-MS, in SPE Abu Dhabi International Petroleum Exhibition and Conference, Society of Petroleum Engineers, Nov. 2017, 8 pages.

Chen et al., "Improved Reservoir History Matching and Production Optimization with Tracer Data," SPE 191523-MS, in SPE Annual Technical Conference and Exhibition, Society of Petroleum Engineers, Sep. 2018, 15 pages.

Chen et al., "FITC functionalized magnetic core-shell Fe$_3$O$_4$/Ag hybrid nanoparticle for selective determination of molecular biothiols," Elsevier Ltd., Dec. 2013, 7 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Coates et al., "Enhancement of luminescence of europium(m) ions in water by use of synergistic chelation. Part 1.1 : 1 and 2 : 1 complexes," J. Chem. Soc, Perkin Trans., Jan. 1, 1996 (Jan. 1, 1996), pp. 1275-1282.

(56) References Cited

OTHER PUBLICATIONS

Constantin and Davidson, "Lamellar La mesophases doped with inorganicnanoparticles," Chem. Phys. Chem. 2014, 15, 1270-1282, 12 pages.

Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.

Das et al., "Molecular Fluorescence, Phosphorescence, and Chemiluminescence Spectrometry," Analytical Chemistiy, Nov. 3, 2011, 29 pages.

Deans, "SPE 7076: Using Chemical Tracers To Measure Fractional Flow and Saturation In-Situ," Society of Petroleum Engineers (SPE), presented at SPE Symposium on improved Methods of Oil Recoveiy, Apr. 16-17, 1978, 10 pages.

Du and Guan, "Interwell tracer tests: lessons learned from past field studies," Spe 93140-MS, in SPE Asia Pacific Oil and Gas Conference and Exhibition, Society of Petroleum Engineers, Apr. 5-7, 2005, 9 pages.

Dugstad, "Chapter 6: Well-to-well tracer tests," in Petroleum Engineering Handbook, 5, pp. 651-683, 2007, 31 pages.

Edwards et al., "Extending the distance range accessed with continuous wave EPR with Gd3+ spin probes at high magnetic fields," Physical Chemistry Chemical Physics, 15(27), 11313-11326, 2013, 14 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Esmaeilzadeh et al., "Effect of ZrO2 nanoparticles on the interfacial behavior of surfactant solutions at airwater and n-heptane-water interfaces," Fluid Phase Equilibria, 2014, 361, 289-295, 7 pages.

Freeze and Cherry, "Chapter 9: Groundwater Contamination," in Groundwater, Englewood Cliffs, NJ: Prentice-Hall, Inc., p. 604, 1979, 80 pages.

Galdiga and Greibrokk, "Ultra-trace determination of fluorinated aromatic carboxylic acids in aqueous reservoir fluids using solid-phase extraction in combination with gas chromatography-mass spectrometry," Journal of Chromatography, vol. 793, Issue 2, Jan. 16, 1998, 10 pages.

Gao et al., "A Surface Functional Monomer-Directing Strategy for Highly Dense Imprinting of TNT at Surface of Silica Nanoparticles," Journal of American Chemical Society, vol. 129, No. 25, Jun. 2007; pp. 7859-7866.

Gardiner et al., "Practical Raman Spectroscopy," Springer-Verlag, 1989, 9 pages.

George et al., "Modified Dipicolinic Acid Ligands for Sensitation and Europium (III) Luminescence," Inorganic Chemistiy, vol. 45, No. 4, Feb. 1, 2006, 6 pages.

Gordon-Grossman et al., "W-Band pulse EPR distance measurements in peptides using Gd3+—dipicolinic acid derivatives as spin labels," Physical Chemistry Chemical Physics, 13(22), 10771-10780, 2011, 10 pages.

Grutzke et al., "Heptacoordinate Heteroleptic Salan (ONNO) and Thiosalan (OSSO) Titanium(IV) Complexes: Investigation of Stability and Cytotoxicity," Inorganic Chemistry 54(14), 6697-6706, Jul. 2015, 10 pages.

Hagoot, "The response of interwell tracer tests in watered-out reservoirs," SPE 11131-MS, in SPE Annual Technical Conference and Exhibition, Society of Petroleum Engineers, Jan. 1982, 21 pages.

Han et al., "Application of Silver-Coated Magnetic Microspheres to a SERS-Based Optofluidic Sensor," The Journal of Physical Chemistry (JPCC), Mar. 7, 2011, 7 pages.

He et al., "Luminescent Europium Chelates Synthesis and Fluorescence Properties," Sensors and Materials (2007), 19(2), 123-132, 10 pages.

Holm et al., "Synthesis, Characterization, and Light-Induced Spatial Charge Separation in Janus Graphene Oxide," Chem. Mater. 2018, 30, 2084-2092, 9 pages.

Hu et al., "Fabrication, properties and applications of Janus particles," Chem. Soc. Rev., 2012, 41, 4356-4378, 23 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 27, 2014, 10 pages.

Huseby et al., "Assessing EOR potential from partitioning tracer data," Spe 172808-MS, in SPE Middle East Oil and Gas Show and Conference, Society of Petroleum Engineers, Mar. 2015, 15 pages.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Jenkins et al., "Ultratrace Determination of Selected Lanthanides by Luminescence Enhancement," Analytical Chemistry, vol. 68, No. 17, Jan. 1, 1996, 7 pages.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kaushik et al., "Gd(III) and Mn(II) complexes for dynamic nuclear polarization: small molecular chelate polarizing agents and applications with site-directed spin labeling of proteins," Physical Chemistiy Chemical Physics, 18(39), 27205-27218, 2016, 36 pages.

Khan et al., "Optimizing waterflood management in a giant UAE carbonate oil field using simulationbased streamlines," SPE 171777-MS, in Abu Dhabi International Petroleum Exhibition and Conference, Society of Petroleum Engineers, Nov. 10-13, 2014, 9 pages.

Kneipp et al., "Single Molecule Detection Using Surface-Enhanced Raman Scattering (SERS)," Physical Review Letters, American Physical Society vol. 78, No. 9, Mar. 3, 1997, 4 pages.

Komberger and Thiele, "Experiences with an Efficient Rate-Management Approach for the 8th Tortonian Reservoir in the Vienna Basin," SPE 166393-PA, SPE Reservoir Evaluation and Engineering, vol. 17, No. 2, May 2014, 12 pages.

Kosynkin and Alaskar, "Oil Industry First Interwell Trial of Reservoir Nanoagent Tracers," SPE 181551-MS, in SPE Annual Technical Conference and Exhibition, Society of Petroleum Engineers, Sep. 2016, 15 pages.

Labbe et al., "Development of metal-chelating inhibitors for the Class II fructose 1,6-bisphosphate (FBP) aldolase," Journal of Inorganic Biochemistry, 112, 49-58, Jul. 2012, 10 pages.

Larsen et al., "Efficient Synthesis of 4,7-Diamino Substituted 1,10-Phenanthroline-2,9-dicarboxamides," Organic Letters, vol. 13, No. 13, Jul. 1, 2011 (Jul. 1, 2011), pp. 3546-3548.

Li et al., "Magic Angle Spinning NMR Structure Determination of Proteins from Pseudocontact Shifts," Journal of the American Chemical Society, 135(22), 8294-8303, May 2013, 10 pages.

Li et al., "Thiol-ene reaction: a versatile tool in site-specific labelling of proteins with chemically inert tags for paramagnetic NMR," Chemical Communications, Cambridge, United Kingdom, 48(21), 2704-2706, 2012, 18 pages.

Luo et al., "Nanofluid of graphene-based amphiphilic Janus nanosheets for tertiary or enhanced oil recoveiy: High performance at low concentration," PNAS, 2016, 113, 7711-7716, 6 pages.

Luo et al., "Secondary Oil Recovery Using Graphene-Based Amphiphilic JanusNanosheet Fluid at an Ultralow Concentration," Industrial & Engineering Chemistry Research, Sep. 2017, 56, 11125-11132, 25 pages.

Manna et al., "Complexation behavior of trivalent actinides and lanthanides with 1,10-phenanthroline-2,9-dicarboxylic acid based ligands: insight from density functional theory," Physical Chemistry Chemical Physics, vol. 14, No. 31, Jan. 1, 2012 (Jan. 1, 2012), p. 11060.

Marais et al., "Time-Resolved Fluorescence for Real-Time Monitoring of Both Scale and Corrosion Inhibitors: a Game-Changing Technique," SPE 179867, Society of Petroleum Engineers, presented at the SPE International Oilfield Scale Conference and Exhibition held in Aberdeen, Scotland, May 11-12, 2016 11 pages.

(56) References Cited

OTHER PUBLICATIONS

Marchetti et al., "Fluorous affinity chromatography for enrichment and determination of perfluoroalkyl substances," Annual Review of Analytical Chemistry vol. 84, Jul. 19, 2012, 8 pages.

Martini et al., "How to Monitor Scale Inhibitor Squeeze using Simple TRF Tracers," Society of Petroleum Engineers, presented at the SPE International Symposium on Oilfield Chemistry held in the Woodlands, Texas, Apr. 13-15, 2015, 8 pages.

McGrail et al., "Selective mono-facial modification of grapheneoxide nanosheets in suspension," Chem. Commun, 2016, 52, 288-291, 5 pages.

Melton et al., "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study," Inorganic Chemistry, vol. 45, No. 23, Nov. 1, 2006 (Nov. 1, 2006), pp. 9306-9314.

micronit.com [online], "Enhanced oil recovery," retrieved from URL <https://www.micronit.com/products/enhanced-oil-recovery.html>, retrieved on Mar. 10, 2020, 5 pages.

Moyner et al., "The Application of Flow Diagnostics for Reservoir Management," Society of Petroleum Engineers (SPE), Apr. 2015, 18 pages.

Muller and Seubert, "Ultra trace determination of fluorobenzoic acids in tap and reservoir water using solid-phase extraction and gas chromatography-mass spectrometry," Journal of Chromatography A, 1260, Oct. 2012, 7 pages.

Negin et al., "Application of nanotechnology for enhancing oil recovery—A review," Petroleum, 2016, 2, 324-333, 10 pages.

Negin et al., "Most common surfactants employed in chemical enhanced oil recovery," Petroleum, 2017, 3, 197-211, 32 pages.

Ng et al., "Graphene-based two-dimensional Janus materials," NPG Asia Materials, vol. 10, No. 4, Apr. 2018, 21 pages.

Nie et al., "Probing Single Molecules and Single Nanoparticles by Surface-Enhanced Raman Scattering," Science, vol. 275, No. 5303, Feb. 1997; pp. 1102-1106.

Ogden et al., "Complexation of Am(III) and Nd(in) by 1,10-Phenanthroli ne-2,9-Di carboxylic Acid," Journal of Solution Chemistry, vol. 42, No. 1, pp. 211-225, 2013, 15 pages.

Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later," Inorganic Chemistry, 41(6), 1436-1445, Feb. 2002, 10 pages.

Parker and Williams, "Getting excited about lanthanide complexation chemistry," Journal of the Chemical Society, Dalton Transactions, vol. 18, 1996, 16 pages.

Parker et al., "Being excited by lanthanide coordination complexes: aqua species, chirality, excited-state chemistry, and exchange dynamics," Chemical Reviews, vol. 102, Issue 6, May 2002, 34 pages.

Peng et al., "A review of nanomaterials for nanofluid enhanced oil recovery," RSC Adv., 2017, 7, 32246-32254, 9 pages.

Petoud et al., "Brilliant SM, Eu, Tb, and Dy Chiral Lanthanide Complexes with Strong Circularly Polarized Luminescence," Journal of the American Chemical Society (JACS), Dec. 15, 2006, 7 pages.

Potapov et al., "Nanometer-Scale Distance Measurements in Proteins Using Gd3+ Spin Labeling," Journal of the American Chemical Society, 132(26), 9040-9048, Jun. 2010, 9 pages.

Qianming et al., "Bspda Synthesis and its Europium (III) Complexes' Fluorescence," Chemical Industry Times, Jul. 2005, 19(7): 38-41, English Abstract.

Rowan et al., "Dynamic Covalent Chemistry," Angewante Chemie International Edition, Mar. 15, 2002, 55 pages.

Sabbatini et al., "Luminescent lanthanide complexes as photochemical supramolecular devices," Coordination Chemistry Reviews, vol. 123, issue 1-2, Feb. 1993, 28 pages.

Sammes and Yshioglu, "Modem bioassays using metal chelates as luminescent probes," Natural Product Reports, vol. 31, No. 1, 1996, 28 pages.

Sanni et al., "A field case study of inter-well chemical tracer test," in SPE International Symposium on Oilfield Chemistry, Society of Petroleum Engineers, Apr. 2015, 17 pages.

Sanni et al., "Pushing the envelope of residual oil measurement: A field case study of a new class of inter-well chemical tracers," Journal of Petroleum Science and Engineering, vol. 163, 2018, 19 pages.

Schmidt et al., "Copper dipicolinates as peptidomimetic ligands for the Src SH2 domain," Bioorganic & Medicinal Chemistry Letters, 14(16), 4203-4206, Aug. 2004, 4 pages.

Schmidt et al., "Synthesis of Mono- and Dinuclear Vanadium Complexes and Their Reactivity toward Dehydroperoxidation of Alkyl Hydroperoxides," Inorganic Chemistry 56(3), 1319-1332, 2017, 14 pages.

Selvin et al., "Principles and biophysical applications of lanthanide-based probes," Annual Review of Biophysics and Biomolecular Structure, Jun. 2002, 28 pages.

Serres-Piole et al., "Direct sensitive simultaneous determination of fluorinated benzoic acids in oil reservoir waters by ultra high-performance liquid chromatography-tandem mass spectrometry," Journal of Chromatography A, 1218, Aug. 2011, 6 pages.

Serres-Piole et al., "Water tracers in oilfield applications: Guidelines," Elsevier Ltd., Journal of Science and Engineering, Nov. 2012, 18 pages.

Sharma and Mohanty, "Wettability Alteration in High-temperature and High-salinity Carbonate Reservoirs," SPE Journal, 2013, 18(4), 646-655, 10 pages.

Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.

Stiles et al., "Surface-enhanced Raman Spectroscopty," Annual Review of Analytical Chemistry, Mar. 18, 2008, 29 pages.

Stryer et al., "Diffusion-enhanced fluorescence energy transfer," Annual Review of Biophysics and bioengineering, vol. 11, Issue 1, 1982, 21 pages.

Su et al., "A Dipicolinic Acid Tag for Rigid Lanthanide Tagging of Proteins and Paramagnetic NMR Spectroscopy," Journal of the American Chemical Society, 130(32), 10486-10487, Jul. 2008, 2 pages.

Tang et al., "Synthesis and fluorescence properties of Tb(III) complexes with pyridine-2,6-dicarboxylic acid derivatives," Journal of Central South University of Technology (English Edition), 15(5), 599-605, Oct. 2008, 7 pages.

Tang et al., "Synthesis of Novel Derivatives of Pyridine-2,6-dicarboxylic Acid," Synthetic Communications: An International Journal for Rapid Communication of Synthetic Organic Chemistry, 36(14), 2027-2034, Jun. 2006, 9 pages.

Tang et al., "Synthesis of Eu(III) and Tb(III) Complexes with Novel Pyridine-2,6-Dicarboxylic Acid Derivatives and Their Fluorescence Properties," Front. Chem. China, 2006, 4: 408-413.

Tian et al., "Off-Resonant Gold Superstructures as Ultrabright Minimally Invasive Surface-Enhanced Raman Scattering (SERS) Probes," American Chemical Society, Jul. 2015, 7 pages.

Toulhoat, "Experimentation and Modelling of U, Th and Lanthanides Transport in Fissured Rocks: Influence of Complexation," MRS Proceedings, vol. 50, Jan. 1, 1985, 8 pages.

Vatanparast et al., "Wettability alteration of low-permeable carbonate reservoir rocks in presence of mixed ionic surfactants," Petroleum Sci. Technol., 2011, 29 (18), 1873-1884, 14 pages.

Wang et al., "The Design and Implementation of a Full Field Inter-Well Tracer Program on a Giant UAE Carbonate Oil Field," in Abu Dhabi International Petroleum Exhibition and Conference, Society of Petroleum Engineers, SPE-177527-MS, Nov. 2015, 8 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

(56) References Cited

OTHER PUBLICATIONS

Wu et al., "A SERS-Assisted 3D Barcode Chip for High-Throughput Biosensing," Small Journal vol. 11, No. 23, Jun. 11, 2015, 9 pages.

Xu et al.., "Measurement of two-photon excitation cross sections of molecular fluorophores with data from 690 to 1050 mu," Journal of the Optical Society of America B, Mar. 1996, 11 pages.

Yang et al., "The Co-Luminescence Groups of Sm-La-pyridyl Carboxylic Acids and the Binding Characteristics between the Selected Doped Complex and Bovine Serum Albumin," Bulletin of the Korean Chemical Society 33(4), 1303-1309, Apr. 20, 2012, 7 pages.

Yang et al., "Paramagnetic labeling of proteins and pseudocontact shift in structural biology," Chinese Journal of Magnetic Resonance, 2014, 31(2):155-171, English Abstract.

Zamberi et al., "SPE 166005: Improved Reservoir Surveillance Through Injected Tracers in a Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Tracers in the Oil Field," in Tracers in the Oil Field, Technology and Engineering, Elsevier, vol. 43, Jan. 1995, 47 pages.

Zhang et al., "Janus Particles: Synthesis, Self-Assembly, Physical Properties, and Applications," Chem. Rev., 2013, 113, 5194-5261, 14 pages.

Zhang et al., "Novel zwitterionic surfactant derived from castor oil and its performance evaluation for oil recovery," Colloids Surfaces A, 2015, 483, 87-95, 42 pages.

Zhou et al., "Upconversion luminescent materials: advances and applications," Chem Rev., Jan. 14, 2015, 71 pages.

\* cited by examiner

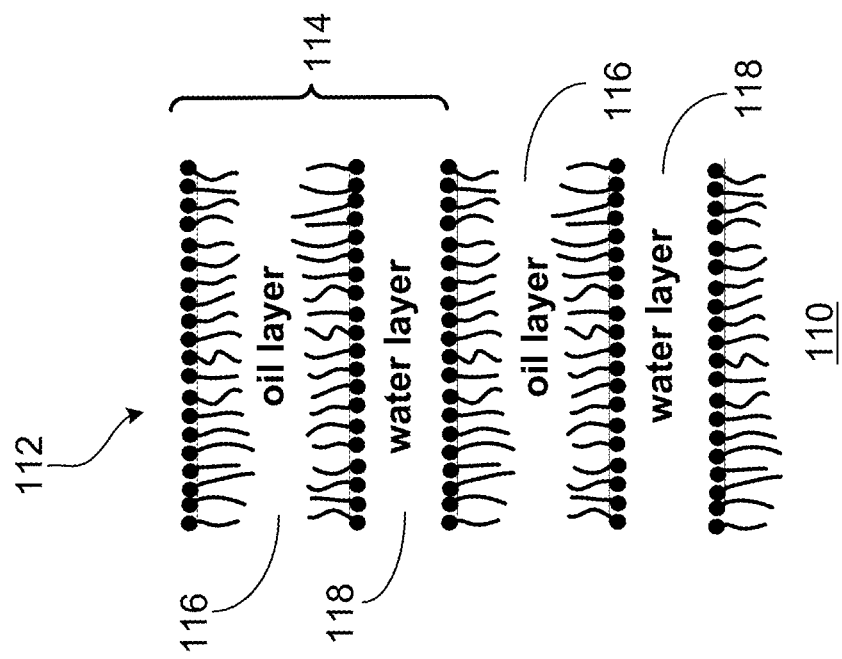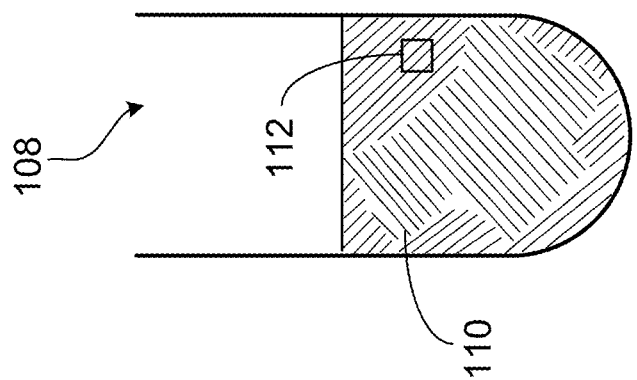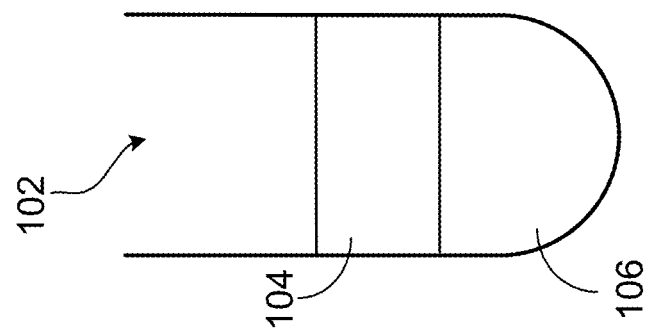
FIG. 1

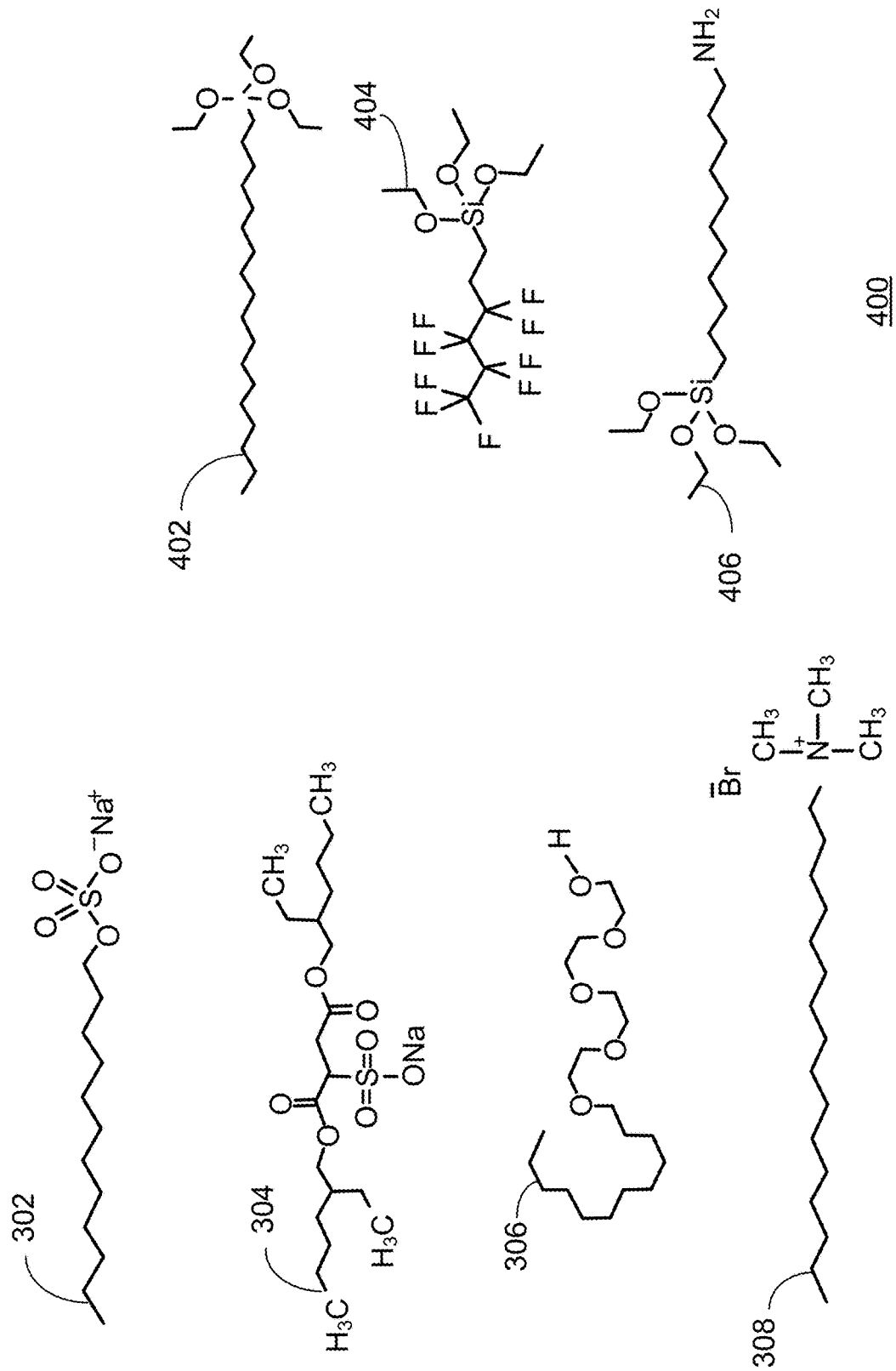

BULK SYNTHESIS OF JANUS NANOMATERIALS

CROSS-REFERENCE TO RELATED APPLICATION(S)

This application is a divisional of and claims the benefit of priority to U.S. patent application Ser. No. 16/818,632, filed Mar. 13, 2020, which claims the benefit of priority to U.S. Provisional Patent Application Ser. No. 62/819,080, filed Mar. 15, 2019, the contents of which are hereby incorporated by reference.

TECHNICAL FIELD

This disclosure relates to Janus nanomaterials such as Janus nanoparticles or Janus nanosheets.

BACKGROUND

Janus particles are types of nanoparticles with at least two surfaces having different respective physical properties. This surface arrangement of Janus nanoparticles allows two different types of chemistry to occur on the same particle. This surface configuration gives properties related to the asymmetric structure or asymmetric functionalization of the particles. The synthesis of Janus nanoparticles generally relies on selectively creating each side of a nanometer-sized particle with different chemical properties. Example syntheses of Janus nanoparticles include masking, self-assembly, and phase separation.

SUMMARY

An aspect relates to a method of synthesizing Janus material, including forming a lamellar phase having water layers and organic layers, incorporating nanosheets into the lamellar phase, adding a functional agent into the lamellar phase, and attaching the functional agent to the nanosheets in the lamellar phase to form Janus nanosheets.

Another aspect relates to a method of synthesizing Janus material, including forming a lamellar phase having a surfactant (or a surfactant with a co-surfactant), water layers, and oil layers. The method includes incorporating hydrophilic nanosheets into the water layers, placing a functional agent into the oil layers, and allowing the functional agent to attach to one face of the hydrophilic nanosheets in the lamellar phase to form Janus nanosheets as Janus nanoparticles.

Yet another aspect relates to a method of synthesizing Janus material, including forming a lamellar phase having a surfactant (or a surfactant with a co-surfactant), water layers, and organic layers. The method includes incorporating graphene oxide (GO) nanosheets into the water layers and adding a functional agent into the organic layers. The method includes attaching the functional agent to the GO nanosheets at interfaces of the water layers and the organic layers to form Janus GO nanosheets which are Janus nanoparticles.

Yet another aspect relates to a nanoreactor including an interface between a water layer of a lamellar phase and an organic layer of the lamellar phase, the nanoreactor forming Janus graphene oxide (GO) nanosheets from GO nanosheets and functional agents.

The details of one or more implementations are set forth in the accompanying drawings and the description later. Other features and advantages will be apparent from the description and drawings, and from the claims.

BRIEF DESCRIPTION OF DRAWINGS

FIG. 1 is a diagram of a bi-phase and a liquid-crystal lamellar phase.

FIG. 3 is a diagram of example representative structures of surfactants to build a lamellar phase for the Janus GO nanosheet synthesis.

FIG. 4 is representative chemical structures of silane compounds as functional agents utilized in functionalization of GO nanosheets to give the Janus GO nanosheets.

Like reference numbers and designations in the various drawings indicate like elements.

DETAILED DESCRIPTION

Figure 2:
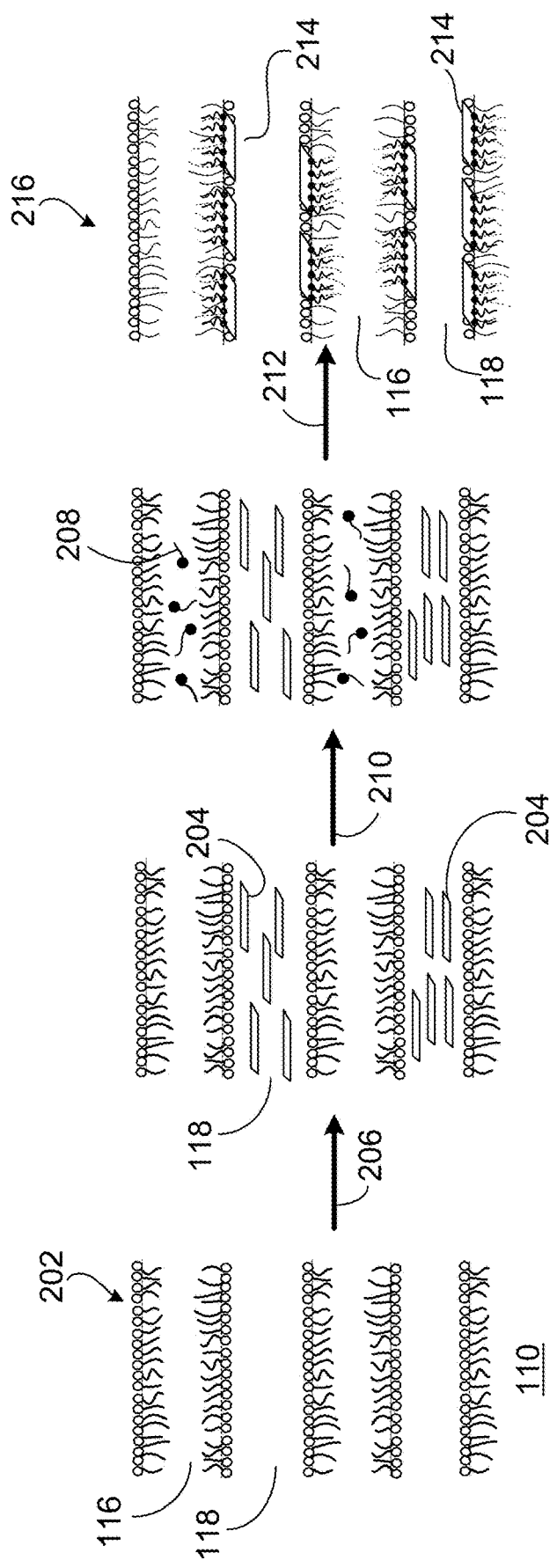
FIG. 2 is a sequence diagram depicting formation of Janus graphene nanosheets (for example, Janus GO nanosheets) at the oil-water interfaces in a lamellar phase.

In some implementations, a Janus nanoparticle may be formed by dividing a nanoparticle into two distinct parts, each of a different respective material or bearing different functional groups. For example, a Janus nanoparticle may have one-half of its surface composed of hydrophilic groups and the other half hydrophobic groups. This may impart properties related to the asymmetric structure or functionalization of the Janus nanoparticle. The synthesis of Janus nanoparticles may rely on selectively forming each side of a nanometer-sized particle with different chemical properties.

This disclosure relates to the high-throughput bulk synthesis (for example, greater than 1 kilogram per hour) of Janus nanosheets. Some aspects are directed to the high-throughput bulk synthesis of Janus graphene nanosheets or graphene oxide nanosheets. The "high-throughput" can mean a million Janus nanosheets produced in a batch time of one or two hours in a single vessel. Janus nanomaterials have beneficial properties but the production of Janus nanomaterials in large quantities (for example, at least one kilogram per hour) has proven difficult in the past. The availability of Janus nanomaterials at commercial-scale quantities could give applications of Janus nanomaterials in several industries. Therefore, present embodiments provide for the mass production of Janus nanomaterials.

Embodiments address application of Janus nanomaterials to extract residual oil after primary recovery and secondary recovery. Nanofluid flooding is an alternative tertiary oil-recovery technique to chemical flooding. Nanoparticle fluid flooding to enhance oil recovery in reservoirs is a substitute or compliment to chemical flooding. Nanoparticle solution flooding with low concentration, for example, 0.01 weight percent (wt %) or less, of nanoparticles is applicable from environmental and economic perspectives. However, the oil recovery factor (obtained by core flooding measurement) for flooding with solutions of homogeneous nanoparticles may be below 5% with 0.01 wt % nanoparticle loading in about 2 wt % saline environment. In contrast, a nanofluid of graphene-based Janus amphiphilic nanosheets could achieve efficiency in oil recovery factor (for example, oil recovery factor of approximately 15%) with an ultralow concentration of loading (for example, less than 0.01 wt % nanoparticle loading).

Present embodiments include Janus graphene nanosheets as a material for nanofluid enhanced-oil-recovery (EOR). To synthesize Janus nanosheets in nanometer size and micrometer size ranges, a selective mono-facial modification process may be implemented, as discussed later. Previous syntheses of Janus amphiphilic nanomaterials have been based on two-dimensional interfacial reactions and which have generally produced relatively small quantities of materials, typically at milligram scale in lab bench experiments. These past techniques have been unable to produce Janus graphene-nanosheets material economically for industrial application.

In response, embodiments of the present techniques employ a lyotropic liquid-crystal phase as a template to produce Janus graphene nanosheets. The liquid-crystal phase medium may include surfactant, water, and oil to generate layered oil-water interfaces with intervals in nanometers (nm) such as approximately 10 nm, which can amplify the interfacial area significantly by at least about a million times (for example, at about $10^6$ order), in comparison to conventional bi-phase solution methods. Homogeneous graphene nanosheets can be incorporated into either the water layers or the oil layers in a controlled manner in the lamellar phase, and each single layer of the layered lamellar phase can serve as a nanoreactor for controllable chemical reactions at the interface. These embodiments can perform interfacial reactions and facilitate production of the Janus nanosheets in quantities more economical for industrial application. Embodiments give a first instance of producing Janus graphene nanosheets at gram levels and which are scaled to produce product at kilogram levels such as in room-temperature reactions.

Lamellar phase may refer generally to packing of polar-headed long chain nonpolar-tail molecules as sheets of bilayers separated by bulk polar liquid. A particular microstructure of interest for certain embodiments is the organic lyotropic liquid-crystal with periodically structural order. This microstructure may be the so-called lamellar (La) phase or smectic A mesophase, formed in solvents with a solvent or mixtures of surfactant and cosurfactant. The surfactant may be nonionic, anionic, or cationic. The lamellar phase may consist of stacks of periodic molecular bilayer-sheets separated by layers of solvents. By adding a solvent, such as either water or oil, the bilayer separation (for example, d-spacing or d, lamellar periodicity) in the lyotropic lamellar phases can be swollen from a nanometer to tens of nanometer. A graphic illustration of the lamellar phase is displayed in FIG. 1.

A liquid crystalline mesophase may be called lyotropic if formed by dissolving an amphiphilic mesogen in a solvent under specified conditions of concentration, temperature, and pressure. In contrast to thermotropic liquid crystals, lyotropics liquid crystals have an additional degree of freedom in the concentration that enables them to induce a variety of different phases. As the concentration of amphiphilic molecules is increased, several different type of lyotropic liquid crystal structures occur in solution, and the lamellar phase may be formed. This lamellar phase is denoted by the symbol La and can be considered the lyotropic equivalent of a smectic A mesophase. The lamellar phase may consist of amphiphilic molecules arranged in bilayer sheers separated by layers of water. A mesophase may be a state of matter intermediate between liquid and solid. Gelatin is a common example of a partially-ordered structure in a mesophase.

FIG. 1 gives diagrams 100 of a bi-phase system 102 and a liquid-crystal system 108 having a lamellar phase 110. The depicted bi-phase system 102 has a single oil-phase layer 104 and a single water-phase layer 106. In contrast, the liquid crystal system 108 has a lamellar phase 110. This liquid crystal system 108 (lamellar phase) may be the liquid crystal phase medium such as the lyotropic liquid-crystal phase. In some implementations, the lamellar phase 110 may be generally prepared by dissolving a surfactant (with or without a cosurfactant) into water and then adding an organic solvent (for example, oil or diesel) under agitation. The surfactant can be a nonionic surfactant, cationic surfactant, or an anionic surfactant. The surfactant can be a mixture of a surfactant and a cosurfactant.

In general, surfactants may be compounds that reduce the surface tension or interfacial tension between two liquids, between a gas and a liquid, or between a liquid and a solid. With respect to the surfactants, the term "nonionic" may mean not ionic, not anionic, or not cationic. For a detergent, nonionic may mean that the detergent does not dissociate into ions in aqueous solution. A nonionic surfactant may have covalently bonded oxygen-containing hydrophilic groups, which are bonded to hydrophobic parent structures. The water-solubility of the oxygen groups may be the result of hydrogen bonding. Hydrogen bonding generally decreases with increasing temperature, and the water solubility of nonionic surfactants therefore decreases with increasing temperature.

A representative section 112 of the lamellar phase 110 is given enlarged for clarity, and which shows the lamellar phase 110 including alternating oil layers 116 and water layers 118. The oil layers 116 may be characterized as oil phase layers 116. The water layers 118 may be characterized as water phase layers 118. Further, the multiple lyotropic liquid crystals are the surfactant molecules with the hydrophilic heads and hydrophobic tails. The surfactant molecules in the exploded view of the representative portion 112 are depicted each with a head and a tail. In implementations, the lamellar phase 110 is generally not a micelle or emulsion. The lamellar phase 110 may typically be a planar structure with surfactant hydrophilic heads contacting water 118 and surfactant hydrophobic tails contacting the organic phase (for example, oil 116) in the illustrated implementation.

The layers 116 may be an oil layer or an organic layer. The oil layers 116 may be more generally an organic layer having organic compounds (for example, chloroform) that are not oil but are hydrophobic. The oil layers 116 may include mineral oil, refined oil, crude oil, fractions of crude oil, diesel, synthetic oil, or vegetable oil. The fractions of crude oil can include organic compounds such as decane or dodecane. The water layers 118 may be more generally an aqueous layer or hydrophilic layer. The water layers 118 may include ground water, treated water (for example, demineralized water), or formation water. The water layers 118 may include components other than water such as dissolved solids. The water layers 118 as an aqueous layer may include chemical components soluble in water.

In some instances, the oil layer 116 and water layer 118 may each be labeled as a lamellar layer. While the combination of the oil layer 116 and the water layer 118 (and with their interface) may instead be labeled as the lamellar layer, this combination is typically instead labeled as a lamellar unit 114 as depicted. The lamellar unit 114 may include the oil layer 116, the water layer 118, the oil-water interface, and the surfactant. While the FIG. 1 depicts the layer 116 as an oil layer, the layer 116 may be an organic layer generally. Again, the surfactant is the hydrophilic heads and hydrophobic tails. The repeating lamellar unit 114 may have a thickness, for example, in a range of 5 nanometers (nm) to 100 nm. In certain embodiments, each lamellar unit 114 may be a nanoreactor.

Embodiments innovatively employ the lamellae as template media to produce Janus nanosheets. The lamellar phase 110 can generate alternating interfaces of water and oil on the nanoscale range and, therefore, the many lamellar units 114 may each be utilized respectively as a nanoreactor for chemical reactions at the water-oil interfaces. The chemical reaction can be controllably-run occurring either at the water phase side or the oil phase side of the interface. Employing these nanoreactors may provide to selectively functionalize a selected side (surface) of graphene nanosheets, producing Janus nanosheets with one side hydrophilic and the other side hydrophobic.

In contrast to the conventional bi-phase system 102 having a single water-oil interface, the lamellar phase 110 gives many water-oil interfaces with each lamellar unit 114 being a respective lamellar nanoreactor. The lamellar phase 110 may have up to a million layer units 114 or more depending on the amount of surfactant and solution capacity.

In the bi-phase system, the majority of the chemical reagents stays in solution phase and only a small percentage (for example, less than 10 wt % of the chemical reagents) reaches the interface for chemical reactions. Conversely, in the lamellar phase 110, most or all of the chemical reagents are confined in thin layers of solvents (for example, oil 116 and water 118) near the interfaces, and thus the chemical reactions may be more effective (for example, incorporating greater than 90 wt % of the chemical reagents). The principle of the lamellar nanoreactor system is illustrated in FIG. 2.

FIG. 2 is a sequence diagram 200 depicting formation of Janus graphene nanosheets at the oil-water interfaces in the lamellar phase 110. As indicated in FIGS. 1 and 2, the alternating oil layers 116 and water layers 118 form a repeating oil-water interface. These repeating oil-water interfaces may provide for repeating nanoreactors. The lamellar unit 114 (see also FIG. 1) may include a single oil layer 116, a single water layer 118, the associated single oil-water interface, and the associated surfactant having the hydrophilic heads and hydrophobic tails. The lamellar phase 110 may have at least one million lamellar units 114, and thus there may be at least one million nanoreactors in the lamellar phase 110. In one implementation, the lamellar phase 110 has at least 100,000 lamellar units which may give a corresponding at least 100,000 nanoreactors.

In the illustrated embodiment of FIG. 2, the lamellar phase 110 is formed or provided, as indicated by reference numeral 202. The lamellar phase 110 may be provided separately or instead the lamellar phase 110 may be formed in conjunction with other actions of the synthesis such as formed contemporaneous with incorporating graphene oxide (GO) nanosheets 204. For instance, in one implementation, the lamellar phase 110 is not formed separately first but instead a GO nanosheet 204 water suspension can directly build the lamellar phase 110. In that implementation, when the lamellar phase 110 forms, the GO nanosheets 204 have also been simultaneously incorporated into the hydrophilic layers (water layers 118) in the lamellar phase 110.

In general, a nanosheet may be a two-dimensional nanostructure with thickness in a scale ranging, for example, from 1 nm to 100 nm. Nanosheets can include silicon nanosheets and carbon nanosheets. A typical example of a nanosheet is graphene, for example, having a thickness of about 0.34 nm. The graphene nanosheet may be an allotrope (form) of carbon consisting of a single layer of carbon atoms arranged in a hexagonal lattice. Synthesis of the nanosheet may be a bottomup technique such as chemical vapor deposition (CVD) and also may be from chemical exfoliation of graphite powder. Graphene may be a structural element of other allotropes of carbon, such as graphite, diamond, charcoal, carbon nanotubes, and fullerenes. Graphene is a crystalline allotrope of carbon with two-dimensional (2D) properties. The carbon atoms may be packed densely in the atomic-scale hexagonal pattern. Thus, graphene is generally a material made of carbon atoms that are bonded together in a repeating pattern of hexagons or a honeycomb pattern. Graphene can be very thin (for example, about 0.34 nm) and thus graphene can be considered pseudo 2D. The single layers of carbon atoms provide the basis for other materials. For instance, graphite is formed by stacked graphene. Carbon nanotubes are made of rolled graphene.

Graphite oxide is a compound of carbon, oxygen, and hydrogen in variable ratios, obtained by treating graphite with oxidizers. The bulk material disperses in basic solutions to yield monomolecular sheets, known as graphene oxide by analogy to graphene the single-layer form of graphite. Graphene oxide (GO) may be a single-atomic layered material made by oxidation of graphite. Graphene oxide may be an oxidized form of graphene, laced with oxygen-containing groups. Graphene oxide may be synthesized by different techniques. The effectiveness of an oxidation to form GO may be evaluated by the carbon/oxygen ratios of the GO in certain instances. The surface of GO may be modified to change properties of the surface.

In the illustrated implementation of FIG. 2, GO nanosheets 204 are added 206 into the water layers 118. The GO nanosheets 204 may be added to the lamellar phase 110, and the GO nanosheets 204 migrate to the water layers 118 because of the affinity of the hydrophilic GO nanosheets 204 for water in comparison to the organic layer or oil layer 116. A functional agent(s) 208 is added 210 to the oil layers 116. The functional agent 208 may be added to the lamellar phase 110, and the functional agent 208 migrates to the oil layer 116 because of the affinity of the hydrophobic functional agent for the oil layer 116.

In certain implementations, the functional agents 208 are silane-based chemical reagents. The depicted configuration exemplary of a head and tail of these functional agents 208 may mean a molecule with a reactive head and not indicative of the molecule being amphiphilic. In this implementation, the molecule overall is hydrophobic. The functional agents 208 may be coupling agents (for example, silane coupling agents) having a functional group to be attached or grafted onto the GO nanosheets 204 such as onto on side surface of the GO nanosheets 204.

As mentioned, in the lamellar phase 110, the functional agents 208 as chemical reagents may generally be confined in thin layers of solvents (for example, oil layer 116 or water layer 118) near the interfaces. To do the surface functionalization of the GO nanosheets 204, the chemical reagents may be added as a water-soluble reagent to the water layer 118 phase or added as an oil-soluble reagent to the oil 116 phase. Examples of hydrophobic reagents added to oil layer 116 are: (1) n-allyltriethoxysilane, alkyl=hexyl, octyl, decyl, docedyl, hexadecyl, octodecyl; and (2) perfluoroalkyl-1H,1H,2H,2H-triethoxysilane, alkyl=hexyl, decyl, octylphenyl. Examples of hydrophilic reagents added to water layer 118 are: (1) aminoalkyltriethoxysilane, alkyl=propyl; and (2) meraptoalkyltriethylsilane, alkyl=propyl.

The functional agent 208 is incorporated or attached 212 onto the GO nanosheets 204 to give Janus GO nanosheets 214, as indicate by reference numeral 216. The chemical reaction occurs at the interface of the water 118 and oil 116 layers. Therefore, as discussed, a single lamellar unit 114 including the combination of a water 118 and an oil 116 layer may be considered as one nanoreactor. Thus, FIG. 2 depicts two nanoreactors in the sequence. As indicated, because interfacial reactions at alternating interfaces of water-oil are involved, the two layers of a water layer 118 and an oil layer 116 in combination may form the nanoreactor. A single nanoscale reactor be characterized as a combination of a single water layer 118, an adjacent single oil layer 116, and the oil-water interface there between.

Therefore, the nanoscale reactor may include the interface between a water layer 118 of a lamellar phase 110 and an oil (or organic) layer 116 of the lamellar phase 110. The interface may be a region or volume at the location of where a water layer 118 meets an oil layer 116. The nanoreactor forms Janus GO nanosheets 214 from GO nanosheets 204 and functional agents 208. The functional agents 208 are attached to a surface of the GO nanosheets 204 in the nanoreactor encompassing the interface. The depiction 216 in FIG. 2 demonstrates the reaction in the oil phase side. However, the reaction can instead be on the water side depending on the nanosheets and functional agents 208. In 216, the surfactant tail is in the oil layer 116 and the surfactant head is water layer 118. In the functionalization, the functional agents 208 (hydrophobic molecules in this implementation) attach onto the GO surface and turn that side (surface) of the GO nanosheet as hydrophobic.

In contrast to graphene nanosheets which are generally hydrophobic, the GO nanosheets 204 are generally hydrophilic and thus inserted into the water layers 118 in the lamellar phase 110 for the further functionalization reaction. Chemical functional groups can be grafted onto the surface of the GO nanosheets 204 via the surface —OH groups of the GO nanosheets 204 from either the water layer 118 side or the oil layer 116 side. Hydrophobic graphene could be inserted into the oil layers 116 in the lamellar phase 110, but the inert surface of graphene is chemically stable and therefore resistant to further surface functionalization.

The type of surfactant(s) chosen may be EOR agents. In general for some implementations, the surfactants employed for the nanoreactors can also be used as EOR agents. In the application of Janus graphene oxide, the surfactants may be used in a diluted suspension of water (for example, seawater or brine) such as at less than 0.5 weight percent of surfactant. In such a concentration, the lamellar phase 110 nanoreactors may be dissolved, and both the surfactant molecules and the Janus GO nanosheets may be dissolved or suspended in the diluted solution, so that no post-synthesis purification or other treatment is needed for certain embodiments. Thus, a benefit may be that that after the synthesis of the Janus nanosheets 214, a post-synthesis purification or other treatments may be avoided. In other words, the collected Janus nanosheet 214 products and lamellar phase 110 reaction templates can be directly employed for EOR application.

Implementations include equipment, operating conditions, and production rate of a commercial system to produce these Janus nanosheets at industrial scale. In embodiments, the chemical reactions occur at ambient temperature and atmosphere pressure. The quantity of product in one batch reaction may depend on the volume of the reaction vessel. The scale can be amplified from lab scale in milliliters to intermediate scale at liters and industrial scale at tens or hundreds of liters. The Janus nanosheets may be collected with the lamellar phase in which the Janus nanosheets are formed. The lamellar phase having the Janus nanosheets may be discharged from the reaction vessel and collected for application(s).

An average recovery factor for a typical oilfield may be less than 50% which results in identified oil left behind despite an existing production infrastructure. To accelerate production and increase recovery factor, EOR schemes may be implemented. EOR is generally a process of increasing the amount of oil that can be recovered from an oil reservoir, typically by injecting a substance into an existing oil well to increase pressure and reduce the viscosity of the oil. EOR may be the process of recovering oil not already extracted from an oil reservoir by primary or secondary recovery techniques. Primary or secondary recovery may rely on natural or enhanced pressures to force oil out of the ground. EOR methods may alter the chemical composition of the oil to facilitate extraction of the oil.

EXAMPLES

Decane was employed as the oil or oil layers in the Examples. FIG. 3 is exemplary representative structures 300 of surfactants to build the lamellar phase 110 for the Janus GO nanosheet 214 synthesis. The exemplary surfactants 300 include: anionic sodium dodecyl sulfate (SDS) 302 in water, hexanol and oil; anionic dioctyl sulfosuccinate sodium (AOT) 304 in water and oil; cationic cetyltrimethylammonium bromide 308 in water and oil; and non-ionic polyoxyethylene(4) lauryl ether (Brij® 30) 306 in water and oil. The oil could be decane, dodecane, mineral oil, diesel or crude oil. To facilitate characterization, decane as the oil to test the system in the laboratory was employed in the Examples. Diesel or crude oil as the oil or oil layer may be utilized in the scale-up synthesis for commercial-scale application.

Surfactants employed in the Examples of the synthesis are commercially available. Moreover, in the Examples after the synthesis, no post-synthesis purification or other treatments was implemented. The Janus nanosheet products and the lamellar reaction templates can be directly applied for EOR application because the surfactants in the Examples are EOR agents and can give synergistic EOR effects.

For each lamellar system, the lamellar periodicity (d) may vary from several nanometers to several tens of nanometers by changing thickness of the organic (oil) layer or the water layer. This lamellar periodicity was determined in the Examples by small-angle x-ray scattering (SAXS) measurement. The lamellar phases 110 in the Examples were made in synthesis controlled with thicknesses of the water layer 118 at 5 nm to 10 nm and oil layer 116 at 2 nm to 15 nm, which are exemplary dimensions for the nanoreactor of the innovative chemical reaction disclosed here.

In synthesis in the Examples, the hydrophilic GO nanosheets were dispersed in water and this suspension utilized to build the lamellar system. Then, functionalization agents were placed into the oil phase, and the oil swelled the lamellar phase. Therefore, the GO nanosheets from the water layer side and the functionalization agents from the oil layer side could approach to meet at the water-oil interface for reactions (for example, hydrolysis) by modifying one side of the nanosheet. To make one side of the nanosheet hydrophobic, the silane coupling agents having hydrophobic functional groups are used for grafting hydrophobic functional groups onto graphene. Representative silane compounds include:
1. n-Alkyltriethoxysilane, alkyl=hexyl, octyl, decyl, docedyl, hexadecyl, octodecyl
2. Perfluoroalkyl-1H,1H,2H,2H-triethoxysilane, alkyl=hexyl, decyl, octylphenyl
3. Aminoalkyltriethoxysilane, alkyl=propyl, butyl, undecyl
4. Meraptoalkyltriethylsilane, alkyl=propanol
5. N-trimethoxyalkyl-N,N,N-trimethylammnium halide, alkyl=propyl, decyl, docedyl, hexadecyl, octodecyl; halide=Cl, Br Example structures are given in FIG. 4.

FIG. 4 is representative chemical structures 400 of silane compounds as functional agents 208 utilized in functionalization of GO nanosheets 204 to give the Janus GO nanosheets 214. Example chemical structures 400 as functional agents 208 include n-octadecyltriethoxysilane 402, nonafluorohexyltriethoxysilane 404, and 11-aminoundecyltrimethoxysilane 406.

Figure 5:
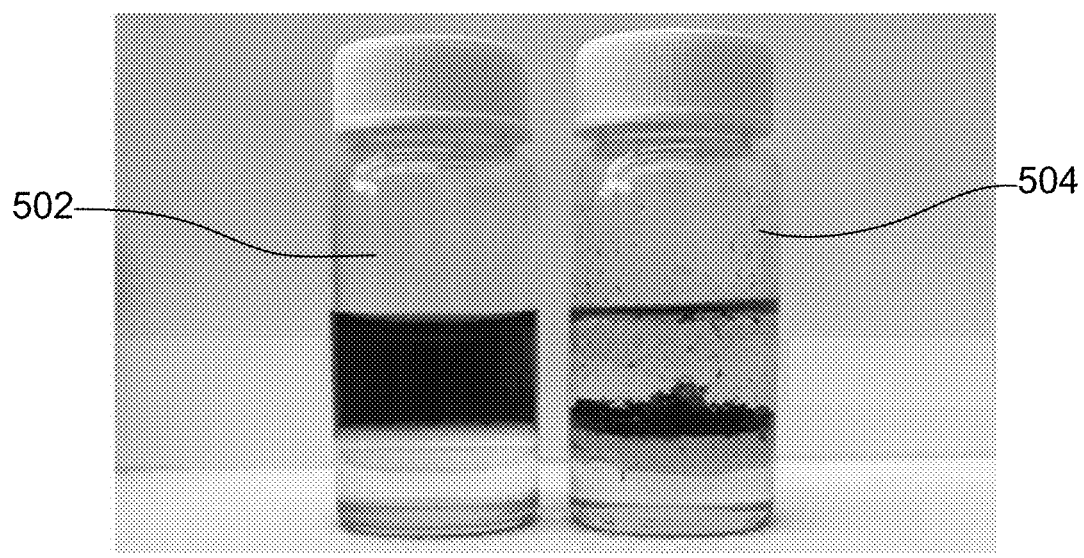
FIG. 5 is an image of GO nanosheets in a water-chloroform mixture and synthesized Janus GO nanosheets in a water-chloroform mixture.

FIG. 5 is an image 500 of GO nanosheets 502 in a water-chloroform mixture and synthesized Janus GO nanosheets 504 in a water-chloroform mixture. The image 500 demonstrates behavior of the nanosheets 502, 504. The unfunctionalized GO nanosheets 502 are hydrophilic and dispersed in the water. In contrast, the functionalized Janus GO nanosheets 504 do not generally disperse either in water or organic phases but tend to aggregate at the water-organic interface, reflecting the asymmetric surface properties of the Janus nanosheet material. This is not the lamellar phase in which the Janus GO nanosheets are formed but instead was a water/organic system to demonstrate behavior of the nanosheets. However, chloroform could be the organic layer in a lamellar phase that forms the Janus GO nanosheets. The organic layer in the Examples was decane as oil. The organic layer or oil layer in the lamellar phase that forms the Janus GO nanosheets can be, for example, decane or dodecane (which may be fractions of crude oil). Also, the oil layer in the lamellar phase can be, for example, diesel or crude oil.

To confirm the formation of Janus nanoparticles, monofacial modified graphene nanosheets with hydrophobic amino groups (—NH2) were coated on hydrophilic and hydrophobic silicon wafer surfaces, respectively. Thus, the amino groups on the hydrophobic face or side of the Janus GO nanosheets pointed away from the nanosheet on the hydrophilic substrate while the amino groups on the hydrophobic side of the Janus GO nanosheets are faced down to the substrate. Then, the Janus GO coated substrates were immersed into a dye solution of $1 \times 10^{-4}$M of Rhodamine B isothiocyanate (RBITC). The RBITC molecules are fluorescent and can be covalently bonded to the —NH2 groups on GO. After washing the substrates with water, unbounded free dye molecules were likely removed, and those molecules bonded with —NH2 groups stayed on the GO surface. The fluorescence analysis is presented with respect to FIG. 6.

Figure 6:
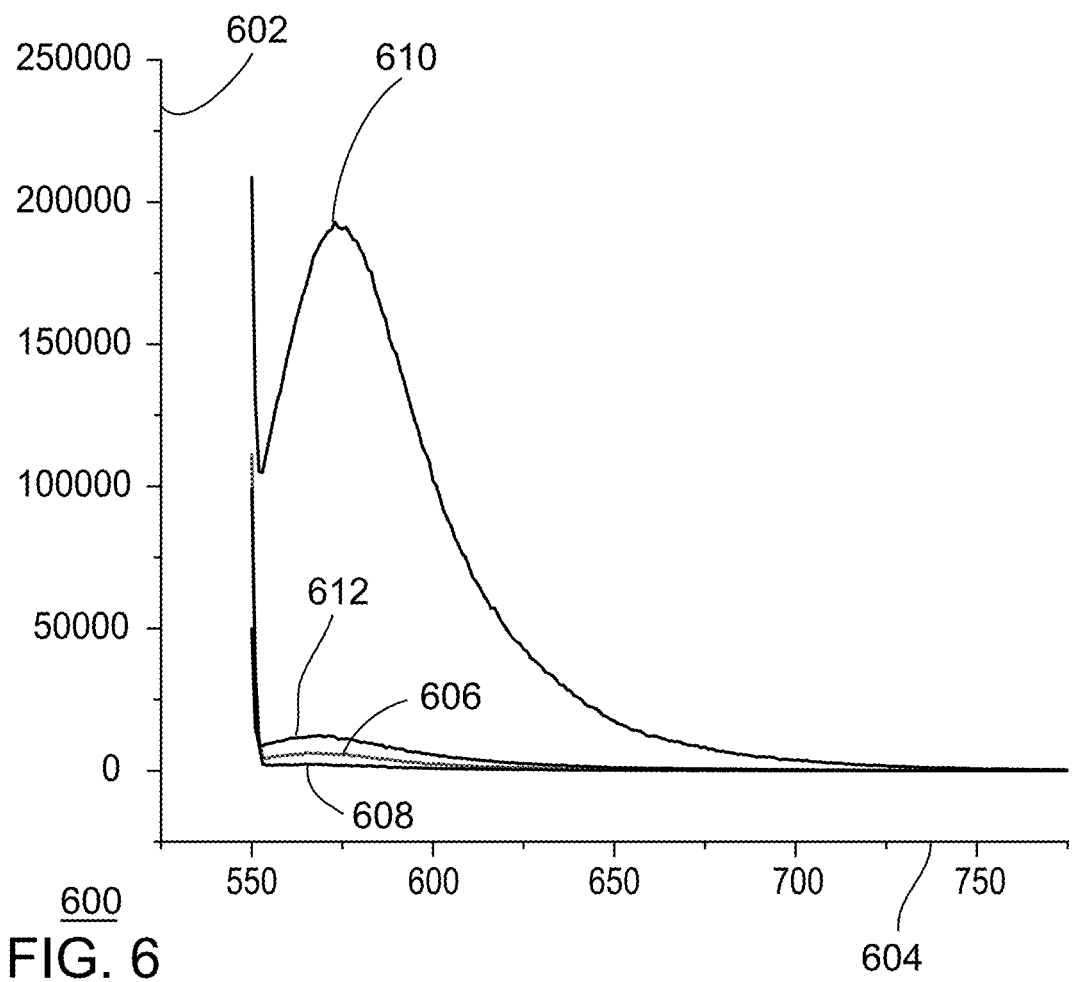
FIG. 6 is a fluorescence spectra of Janus GO nanosheets deposited on hydrophilic and hydrophobic substrates.

FIG. 6 is fluorescence spectra of Janus GO nanosheets deposited on hydrophilic and hydrophobic substrates and selectively bonded with dye Rhodamine B isothiocyanate (RBITC) molecules. FIG. 6 is a fluorescence spectra plot 600 of intensity 602 (arbitrary units or a.u.) versus wavelength 604 (nm). The fluorescence spectra intensity of the Janus GO nanosheets on the hydrophilic substrate is given by curve 606. The fluorescence spectra intensity of the Janus GO nanosheets on the hydrophobic substrate is given by curve 608. The fluorescence spectra intensity of the Janus GO nanosheets on the hydrophilic substrate in the RBITC is given by curve 610. The fluorescence spectra intensity of the Janus GO nanosheets on the hydrophobic substrate in the RBITC is given by curve 612.

As indicated in the fluorescence spectra of FIG. 6, when the hydrophobic surface of GO with the —NH2 groups faced down to the substrate, very weak fluorescence is exhibited as depicted in the spectrum. Conversely, when the hydrophobic surface of GO with the —NH2 groups are faced out to the solution, strong fluorescence appears as depicted in the spectrum. These phenomena demonstrate the different faces of a single Janus nanosheet.

Figure 7:
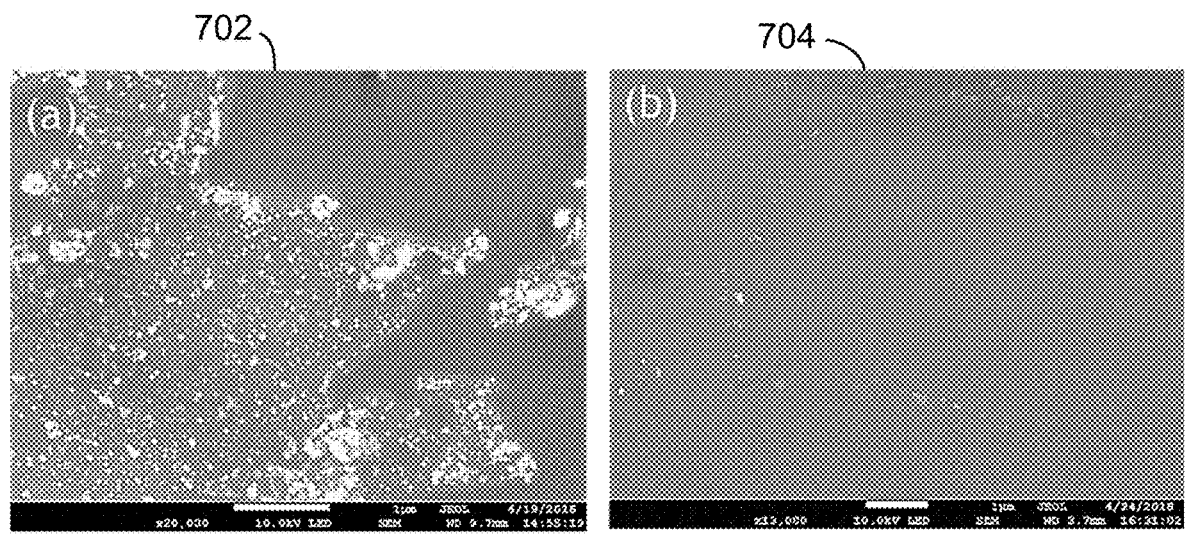
FIG. 7 is scanning electron microscope (SEM) images of Janus GO nanosheets deposited on substrates.

FIG. 7 is scanning electron microscope (SEM) images 700 of Janus GO nanosheets deposited on (a) hydrophilic substrate and (b) hydrophobic substrate. To prepare for SEM imaging, the samples were treated with silver (Ag) colloidal nanoparticles in suspension and then washed by water. The SEM image 702 is Janus GO nanosheets deposited on a hydrophilic substrate. The SEM image 704 is Janus GO nanosheets deposited on a hydrophobic substrate. SEM was employed to observe the morphology of the Janus GO nanosheets. As indicated, to differentiate the two faces of a Janus GO nanosheet, thin films of Janus GO nanosheets on respective hydrophilic and hydrophobic silicon (Si) wafers were immersed in a suspension of Ag colloidal nanoparticles and then rinsed by water. The SEM images 702 and 704 show that the Ag nanoparticles generally only interact with the surface having hydrophobic—NH2 groups. When the hydrophobic chain with —NH2 group attached on the Si wafer, generally no Ag nanoparticles attached onto the hydrophilic face of a Janus GO nanosheet. Analysis by energy-dispersive x-ray spectroscopy (EDS or EDX) further confirmed the existence of Ag on the Janus GO surface, as indicated in FIG. 8.

Figure 8:
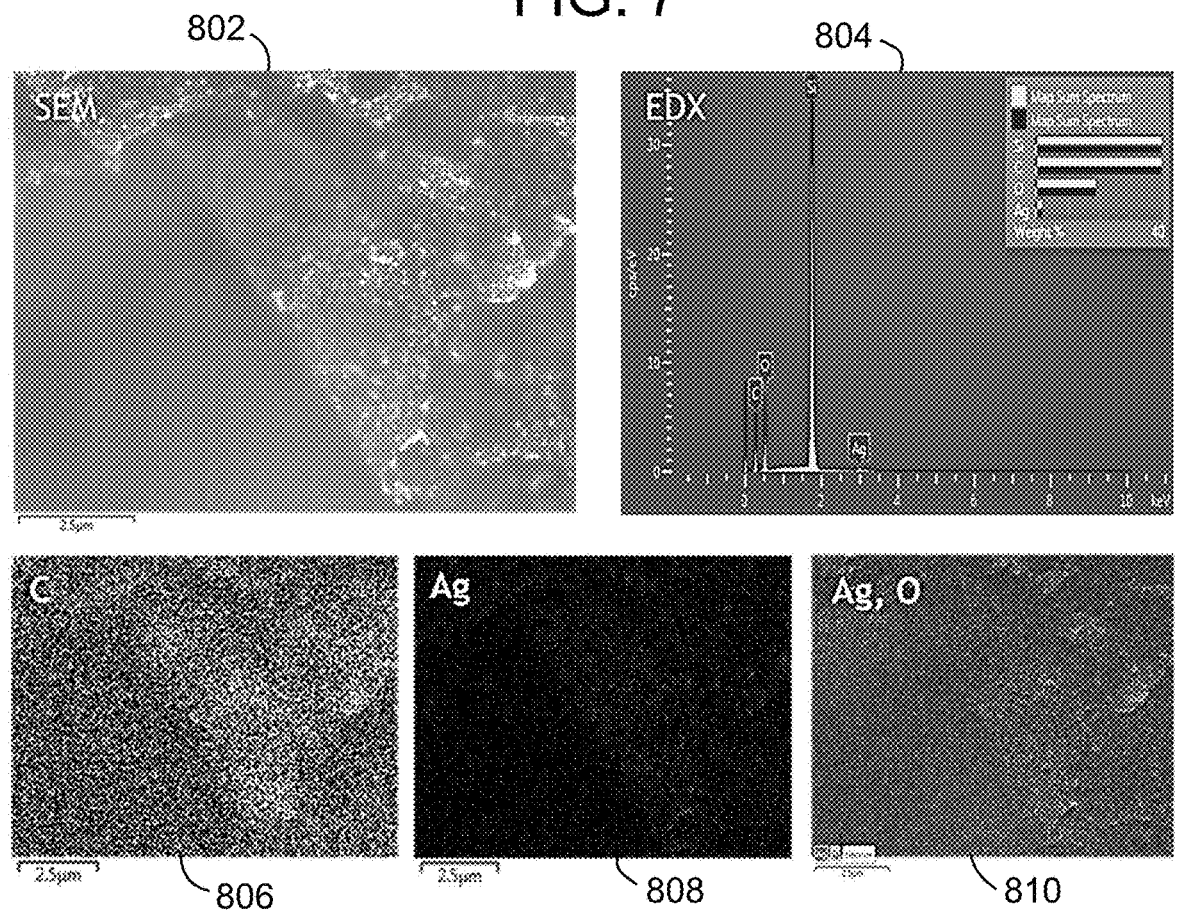
FIG. 8 are images associated with energy-dispersive x-ray spectroscopy (EDS) element analyses of Janus GO nanosheets deposited on a hydrophobic substrate with attached silver (Ag) nanoparticles.

FIG. 8 are images 800 related to the EDS element analyses of Janus GO nanosheets deposited on a hydrophobic substrate with attached Ag nanoparticles. EDS or EDX is an analytical technique for the elemental analysis or chemical characterization of a sample. The SEM image 802 of the Janus GO nanosheets deposited on a hydrophobic substrate with attached Ag nanoparticles is given. The EDS or EDX results spectra 804 shows peaks for carbon, oxygen, silicon, and silver. The EDS image 806 is for carbon. The EDS image 808 is for silver. The EDS image 810 is for the combination of silver and oxygen.

Figure 9:
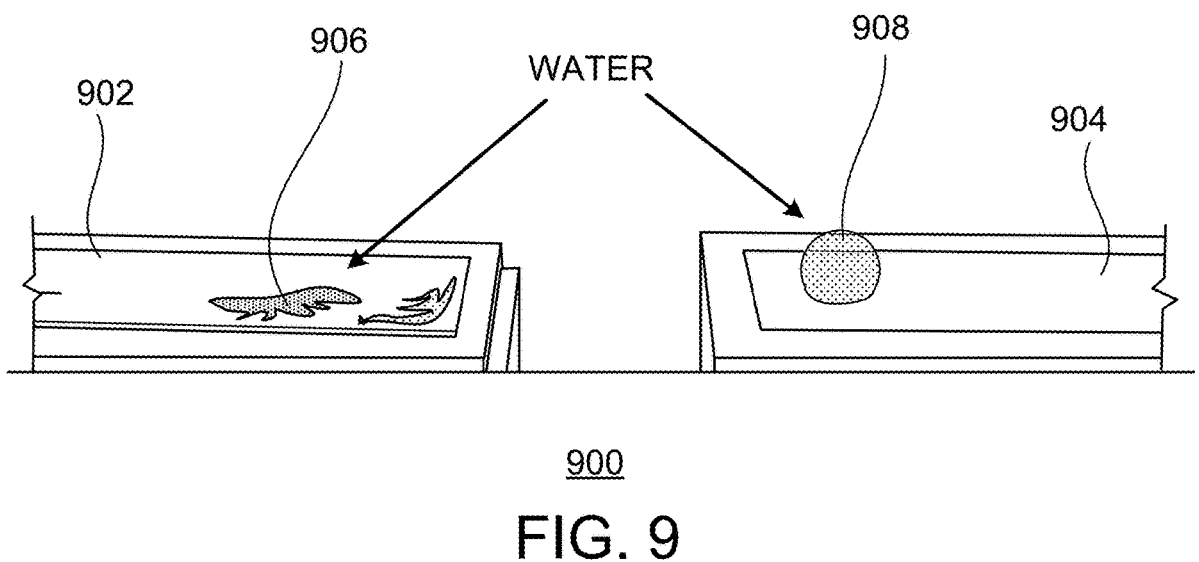
FIG. 9 is a diagram images of substrates coated by different sides of Janus GO nanosheets.

FIG. 9 is diagram representations 900 of photographs of substrates coated by different sides of Janus GO nanosheets. The Janus GO nanosheets 902 are coated on a hydrophobic substrate. The Janus GO nanosheets 904 are coated on a hydrophilic substrate. When the Janus GO nanosheets 902 are coated on the hydrophobic substrate, the hydrophobic side of the nanosheets attach onto the substrate and thus convert the substrate surface from hydrophobic to hydrophilic. When the Janus GO nanosheets 904 are coated on the hydrophilic substrate, the hydrophilic side of the nanosheets attach onto the substrate and thus convert the substrate surface from hydrophilic to hydrophobic. The observation of contact angle of water 906, 908 on the surfaces confirmed this, as indicated in FIG. 9.

Figure 10:
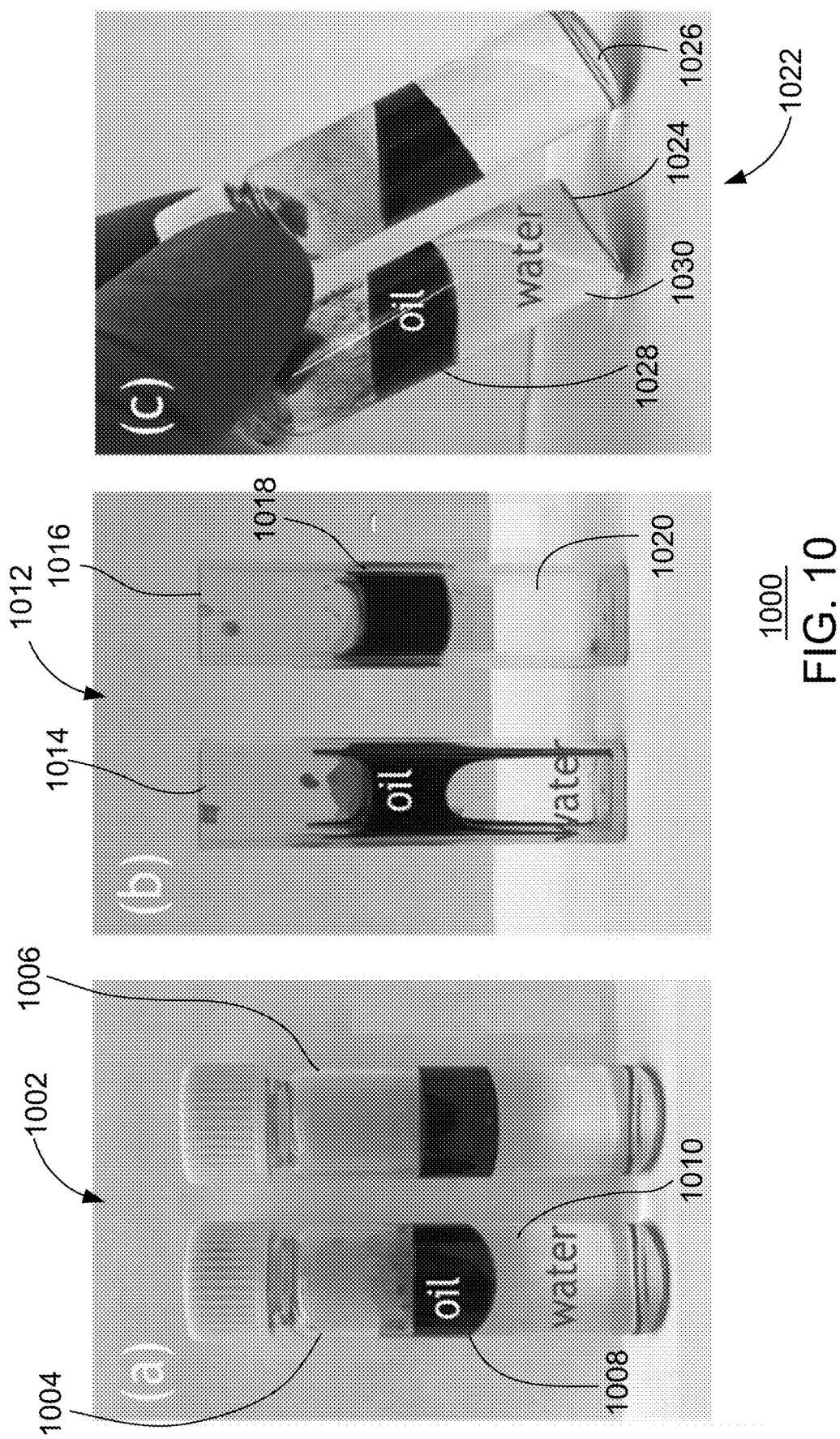
FIG. 10 is images indicating behaviors of the synthesized Janus GO nanosheets in a crude oil-water system.

FIG. 10 is images 1000 indicating behaviors of the synthesized Janus GO nanosheets in a crude oil-water system with increasing hydrodynamic power: (a) seawater-crude oil bi-phase system, (b) nanofluid injection to seawater-crude oil system, and (c) interfacial film formation at the seawater-oil interface. The image 1002 depicts a hydrophilic container 1004 with the crude oil 1008 and seawater 1010 as a bi-phase system without the Janus GO nanosheets. The hydrophilic container 1006 has the same bi-phase system but with the Janus GO nanosheets.

The image 1012 is a hydrophobic container 1014 having the crude oil-seawater bi-phase system without the Janus GO sheets. The hydrophobic container 1016 has the same bi-phase system but with the Janus GO nanosheets. With the presence of the Janus GO nanosheets, the oil layer 1018 and the water layer 1020 are defined and not dispersed.

The image 1022 is a hydrophilic container 1024 having the oil and water layers 1028, 1030 without the Janus GO nanosheets. Such may be analogous to the container 1004 and bi-phase system in image 1002 but with container 1024 leaned to demonstrate effect on the interface between the oil layer 1028 and the water layer 1030. The hydrophilic container 1026 has the same bi-phase system but with the Janus GO nanosheets. The interface between the oil and water is generally unaffected by the leaning of the hydrophilic container 1026.

The properties of Janus GO nanosheets may have an effect on the water-oil interface. When injecting the Janus GO nanosheets suspension at ultralow concentration of less than 0.01 wt % into a water-oil mixture, the interfacial tension at the water-oil interface can be altered.

Embodiments provide an innovative technique for synthesizing Janus GO nanosheets in relatively large quantities. Such quantities can be greater than a million nanosheets in a single batch in a vessel. The technique may be at industrial scale and for a wide range of applications of Janus GO nanosheets in various industries. The Janus GO nanosheets can alter interfacial properties of water-oil interfaces. The Janus GO nanosheets have application in a nanoagent solution for EOR in oil and gas recovery applications.

Embodiments employ lyotropic liquid crystal phase as a template for Janus nanoparticle synthesis and with efficiency of interfacial reactions by a million times (at $10^6$ order) compared with current conventional bi-phase reactions. Such promotes and facilitates bulk Janus nanosheets production feasible for industrial applications. The innovative nanoreactor utilizes a lyotropic liquid crystal phase as template media for chemical reactions at water-oil interfaces. A chemical reaction route is implemented to fabricate Janus graphene nanosheets in bulk quantities. The structural and property characterizations of the synthesized graphene or GO nanomaterials may be evaluated. Functionalized graphene or GO nanosheets may be designed and characterized. Microfluidic imaging of functionalized GO nanosheets may be performed for EOR applications.

Figure 11:
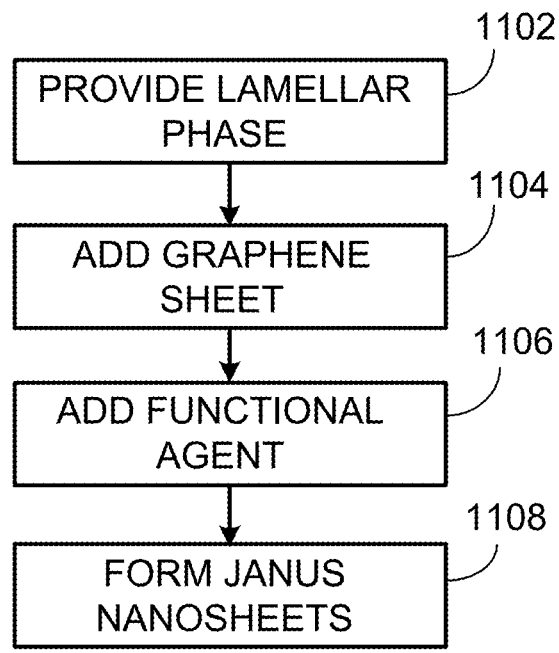
FIG. 11 is a block flow diagram of method of synthesizing Janus material.

FIG. 11 is a method 1100 of synthesizing Janus material such as Janus nanomaterial or Janus nanoparticles. The Janus material is synthesized in a lamellar phase. The Janus nanoparticles may be Janus nanosheets such as Janus graphene nanosheets. The Janus graphene nanosheets may be Janus GO nanosheets. The synthesis of the Janus nanosheets may be performed in a vessel, such as in a batch operation. Semi-batch or continuous operations may be employed.

At block 1102, the method includes providing or forming a lamellar phase having water layers and organic layers. The water layers may be characterized as water phase layers. Likewise, the organic layers may be characterized as organic phase layers. Moreover, in particular embodiments, the organic layers are oil layers. In certain embodiments, the lamellar phase is placed or formed in the vessel in which the synthesis (for example, batch synthesis) is to occur.

Further, the lamellar phase may include a surfactant. The surfactant may be a nonionic surfactant, a cationic surfactant, or an anionic surfactant. The lamellar phase may include a mixture of the surfactant and a cosurfactant. In certain implementations, hydrophilic heads of the surfactant contact the water layers and hydrophobic tails of the surfactant contact the organic layers. A cosurfactant may be a chemical utilized with a surfactant to improve performance or enhance effectiveness of the surfactant. A cosurfactant may be defined as a surfactant that acts in addition to another surfactant and thus further reduces the surface tension of a liquid. A cosurfactant may be employed to increase the oil-solubilizing capacity of a microemulsion surfactant system. An example of such a cosurfactant is a long-chain (at least 5 carbons) alcohol.

A surfactant may organize at a liquid-liquid boundary which can lead to an organized interface and liquid-crystal phases. To achieve ultralow interfacial tension (for example, less than 0.01 millinewton per meter) for EOR applications, a cosurfactant may be added to disturb the organized liquid-liquid interface.

In some implementations, the surfactant is an EOR agent for flooding or chemical injection, or both. Therefore, the Janus nanomaterial synthesized in the lamellar phase in method 1100 generally need not be separated from the lamellar phase for application in EOR such as nanoflooding. In other words, the lamellar phase having the formed Janus nanoparticles (nanosheets) after synthesis may be collected and utilized in nanoflooding EOR. In some examples, the collection may involve discharging of the lamellar phase with the Janus nanoparticles from the vessel to a storage vessel.

As discussed earlier, a lamellar unit (nanoreactor) of the lamellar phase may include a water layer and an organic layer. Lamellar units (for example, at least 100,000 in the lamellar phase) may each include a respective water layer and respective oil layer, and where each lamellar unit may be a nanoreactor.

At block 1104, the method include adding or incorporating nanosheets into the lamellar phase. The nanosheets may be hydrophilic nanosheets such as GO nanosheets, and where the nanosheets are incorporated into the water layers. In examples, the nanosheets are placed into the lamellar layer, and the hydrophilic nanosheets position, migrate, or flow into the water layers because of the affinity of the hydrophilic nanosheets for the water layers. The nanosheets may be hydrophobic nanosheets such as graphene nanosheets, and where the nanosheets are incorporated into the organic layers.

In some implementations, the forming (block 1102) of the lamellar phase is contemporaneous with incorporating the nanosheets into the lamellar phase. For example, the forming of the lamellar phase and the incorporating of the nanosheets (for example, hydrophilic) includes forming a water suspension of the nanosheets in water and building the lamellar phase with the water suspension. Thus, as the lamellar phase forms, the nanosheets are simultaneously incorporated into the water layers in the lamellar phase.

At block 1106, the method includes adding a functional agent to the lamellar phase. For example, the method may include placing the functional agent into the organic layers or oil layers. The functional agents may be placed into the lamellar phase, and the functional agents migrate into the organic layers because of the affinity of the hydrophobic functional agents for the organic layers. In particular implementations, the functional agent is a silane coupling agent having a functional group. The functional agent may be silane-based chemical reagents. The functional agent may include silane compounds having one or more functional groups.

At block 1108, the method includes forming the Janus nanosheets. In particular, the method includes attaching the functional agent to the nanosheets in the lamellar phase to form the Janus nanosheets. The method may include allowing the functional agent to attach to the nanosheets in the lamellar phase to form Janus nanosheets as Janus nanoparticles. In one implementation, the nanosheets are hydrophilic GO nanosheets and the Janus nanoparticles formed are Janus GO nanosheets.

The method may include attaching the functional agent to the nanosheets at interfaces of the water layers and the organic layers to form the Janus nanosheets. The Janus nanosheets may be Janus graphene nanosheets or Janus GO nanosheets that may be characterized as Janus nanomaterial or Janus nanoparticles. In certain embodiments, the functional agent is hydrophobic molecules, and where allowing the functional agent to attach to the nanosheets as hydrophilic nanosheets involves the functional agent attaching onto a surface of a hydrophilic nanosheet converting that surface to hydrophobic.

In general, nanoreactors may be a form of chemical reactor that are particular in disciplines of nanotechnology. Nanoreactors may maintain a working nanofoundry that manufacture products on a nanoscale. A nanoreactor may carry out chemical reactions in a limited space whose size does not exceed 100 nm in at least one dimension and is physically limited by the dimensions of ordered structure elements.

In the lamellar phase, a nanoreactor that forms Janus nanosheets may include the interface between a water layer of a lamellar phase and an organic layer (for example, oil layer) of the lamellar phase. The lamellar phase may include a surfactant such as a nonionic surfactant, anionic surfactant, or cationic surfactant. The lamellar phase may have at least 100,000 lamellar units. Thus, the lamellar phase may have at least 100,000 nanoreactors. In operation, GO nanosheets may be received into the water layer of the nanoreactor for migration to the interface. A functional agent may be received into the organic layer of the nanoreactor for migration to the interface and to be attached to one side of the GO nanosheets to form the Janus GO nanosheets. The functional agent may be a silane-based chemical reagent. In some implementations, the formed Janus GO nanosheets are not separated from the lamellar phase or nanoreactor. The lamellar phase having the Janus GO nanosheets may be applied as an EOR agent for chemical injection or flooding of a geological formation in tertiary recovery.

Oil production may be separated into at least three phases: primary, secondary, and tertiary. Tertiary recovery may also be known as EOR. Primary oil recovery is generally limited to hydrocarbons that naturally rise to the surface or recovered via artificial lift devices such as pumps. Secondary recovery employs water and gas injection, displacing the oil to the surface. Primary and secondary recovery of production can leave, for example, up to 75% of the oil in the well. A way to further increase oil production is through tertiary recovery or EOR. Although typically more expensive to employ on a field, EOR can increase production from a well, for example, up to 75% recovery. Again, EOR may be labeled as tertiary recovery and can be the extraction of crude oil from an oil field that generally cannot be extracted otherwise. For example, EOR may extract 30% to 60% or more of reservoir oil compared to 20% to 40% recovery of reservoir oil employing primary and secondary recovery. The EOR may involve thermal recovery (for example, steam flooding or fire flooding), gas injection (for example, carbon dioxide), or chemical injection (for example, polymers or surfactants). More advanced speculative EOR techniques are sometimes called quaternary recovery. In EOR, physical and chemical properties of the rock may be changed to enhance the recovery of hydrocarbon. The properties of the reservoir fluid system which are affected by EOR may be chemical, biochemical, density, miscibility, interfacial tension (IFT), surface tension (ST), viscosity and thermal. Secondary recovery may involve water injection or waterflooding and in which EOR may be performed thereafter. EOR or tertiary recovery may involve flooding or waterflooding which may include chemical flooding, polymer flooding, surfactant flooding, nanoflooding such as nanofluid flooding or nano material (nanoparticle) flooding, or any combinations thereof. Embodiments herein are Janus graphene nanosheets as a material for EOR involving nanoflooding such as nanofluid (nanoparticle) flooding.

Figure 12:
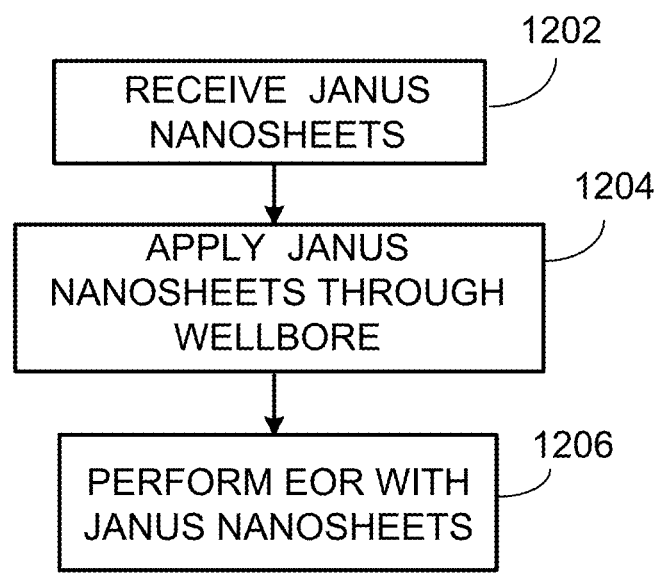
FIG. 12 is a block flow diagram of a method of enhanced oil recovery (EOR).

FIG. 12 is a method 1200 of using a Janus nanoparticle such as a Janus nanosheet which may be Janus GO nanosheet. The method may be EOR such as nanofluid flooding or nanoflooding. The EOR may be performed at a well site having a wellbore formed into a geological formation. The geological formation is a hydrocarbon-bearing formation. The EOR may promote recovery of hydrocarbon from the geological formation.

At block 1202, the method includes receiving Janus nanosheets at the well site. The Janus nanosheets may be Janus GO nanosheets that are Janus nanoparticles. The Janus nanosheets may be received in a lamellar phase in which the Janus nanosheets were formed. The lamellar phase may include a surfactant that is an EOR agent employed in surfactant flooding and compatible with nanofluid flooding. The Janus nanosheets (and lamellar phase) may be received into a surface vessel at the well site or received via a vessel on a vehicle to the well site.

At block 1204, the method includes introducing the Janus nanoparticles into the geological formation. The method may include applying the Janus nanosheets through the wellbore into the geological formation. The wellbore may be of a producing well or an injection well. The Janus nanosheets (or lamellar phase having the Janus nanosheets) may be injected in a fluid (for example, water) through the wellbore into the geological formation to contact hydrocarbon or hydrocabon-bearing fluid in the geological formation. The Janus nanosheets in the fluid may be pumped through the wellbore into the geological formation.

At block 1206, the method includes performing EOR through the geological formation with the Janus nanosheets. The EOR may be nanoflooding. The Janus nanosheets are generally Janus nanoparticles. The method includes contacting hydrocarbon (for example, crude oil) or hydrocarbon-bearing fluid in the geological formation with the Janus nanosheets.

In summary, an embodiment is a method of EOR including receiving Janus nanoparticles that are Janus GO nanosheets, injecting the Janus nanoparticles through a wellbore into a geological formation to contact hydrocarbon in the geological formation, and performing nanoflooding through the geological formation with the Janus nanoparticles.

A number of implementations have been described. Nevertheless, it will be understood that various modifications may be made without departing from the spirit and scope of the disclosure.

What is claimed is:

1. A nanoreactor comprising graphene oxide (GO) nanosheets at an interface between a water layer of a lamellar phase and an organic layer of the lamellar phase and functional agents, the nanoreactor is used to form Janus GO nanosheets from the GO nanosheets and the functional agents.

2. The nanoreactor of claim 1, wherein the lamellar phase comprises at least 100,000 lamellar units.

3. The nanoreactor of claim 1, wherein the lamellar phase comprises at least 100,000 nanoreactors.

4. The nanoreactor of claim 1, wherein the nanoreactor comprises the water layer and the organic layer.

5. The nanoreactor of claim 1, wherein the organic layer comprises an oil layer.

6. The nanoreactor of claim 1, wherein the functional agents comprise silane-based chemical reagents.

7. The nanoreactor of claim 1, wherein the lamellar phase comprises a nonionic surfactant.

8. The nanoreactor of claim 1, wherein the lamellar phase comprises an anionic surfactant or a cationic surfactant.

* * * * *